US009447921B2

(12) United States Patent
Liem et al.

(10) Patent No.: US 9,447,921 B2
(45) Date of Patent: Sep. 20, 2016

(54) MULTI-FUNCTION UNIT FOR THE OFFSHORE TRANSFER OF HYDROCARBONS

(71) Applicant: SINGLE BUOY MOORINGS INC., Marly (CH)

(72) Inventors: Pieter Liem, Monte-Carlo (MC); Jean-Robert Fournier, Nice (FR); Jean-Charles Rinaldi, Cannes (FR)

(73) Assignee: SINGLE BUOY MOORINGS INC., Marly (CH)

( * ) Notice: Subject to any disclaimer, the term of this patent is extended or adjusted under 35 U.S.C. 154(b) by 220 days.

(21) Appl. No.: 14/023,820

(22) Filed: Sep. 11, 2013

(65) Prior Publication Data

US 2014/0027008 A1 Jan. 30, 2014

Related U.S. Application Data

(60) Division of application No. 13/112,648, filed on May 20, 2011, now Pat. No. 8,622,099, which is a continuation of application No. PCT/NL2009/050704, filed on Nov. 20, 2009.

(30) Foreign Application Priority Data

Nov. 20, 2008 (EP) ..................................... 08169566
Apr. 29, 2009 (EP) ..................................... 09159105

(51) Int. Cl.
*F17C 6/00* (2006.01)
*B63B 27/24* (2006.01)
(Continued)

(52) U.S. Cl.
CPC ............... *F17C 6/00* (2013.01); *B63B 22/021* (2013.01); *B63B 27/24* (2013.01); *B63B 27/34* (2013.01);

(Continued)

(58) Field of Classification Search
CPC ....... B63B 35/00; B63B 35/04; B63B 35/06; B63B 2035/006
USPC .................. 141/59, 98, 234, 237, 382, 387; 137/615; 114/230.1–230.3; 441/2-5
See application file for complete search history.

(56) References Cited

U.S. PATENT DOCUMENTS 3,742,536 A 7/1973 Sada et al.
3,750,723 A 8/1973 Schirtzinger (Continued)

FOREIGN PATENT DOCUMENTS

GB 2 002 715 2/1979
GB 2 399 320 9/2004

(Continued)

OTHER PUBLICATIONS

International Search Report, dated Apr. 27, 2010, from corresponding PCT application.

*Primary Examiner* — Timothy L Maust
(74) *Attorney, Agent, or Firm* — Young & Thompson

(57) ABSTRACT

A hydrocarbon transfer arrangement for transfer of fluids between an offshore unit and a carrier which are placed in an offloading configuration, includes at least one transfer hose and a gas return hose, wherein the end of the at least one transfer hose is connected to a floating multi-function unit allowing for the transport of the transfer hose between the offshore unit and the carrier, wherein the floating multi-function unit can be lifted out of the water and can be held in a fixed position above water-level and is provided with connection elements for making a fluid connection between the transfer hose end and a manifold of the carrier and with emergency disconnect elements for the at least one transfer hose, placed at a distance from the connection elements.

9 Claims, 11 Drawing Sheets

(51) Int. Cl.

*B63B 27/34* (2006.01)
*F17C 9/00* (2006.01)
*B63B 22/02* (2006.01)
*B67D 7/54* (2010.01)
*B67D 9/00* (2010.01)

(52) U.S. Cl.

CPC . *B67D 7/54* (2013.01); *F17C 9/00* (2013.01); *B67D 9/00* (2013.01); *F17C 2201/0128* (2013.01); *F17C 2205/0355* (2013.01); *F17C 2205/0364* (2013.01); *F17C 2205/0367* (2013.01); *F17C 2221/013* (2013.01); *F17C 2221/033* (2013.01); *F17C 2221/035* (2013.01); *F17C 2223/0161* (2013.01); *F17C 2223/033* (2013.01); *F17C 2225/0161* (2013.01); *F17C 2225/033* (2013.01); *F17C 2227/0135* (2013.01); *F17C 2227/044* (2013.01); *F17C 2250/032* (2013.01); *F17C 2260/033* (2013.01); *F17C 2265/05* (2013.01); *F17C 2265/061* (2013.01); *F17C 2265/063* (2013.01); *F17C 2270/0105* (2013.01); *F17C 2270/0113* (2013.01); *F17C 2270/0126* (2013.01); *Y10T 137/0318* (2015.04); *Y10T 137/6855* (2015.04)

(56) References Cited

U.S. PATENT DOCUMENTS 3,969,781 A 7/1976 Reid
4,231,398 A 11/1980 Gibbons
4,269,239 A * 5/1981 Haley .................... B63B 27/24 137/615
4,276,917 A * 7/1981 Fujita ....................... B67D 9/02 137/615
4,315,408 A 2/1982 Karl
4,346,843 A * 8/1982 Long .................... A01G 25/095 137/615
4,478,586 A 10/1984 Gentry et al.
4,501,525 A 2/1985 Grundy et al.
4,587,919 A 5/1986 Loire et al.
4,645,467 A 2/1987 Pollack
4,658,873 A * 4/1987 von Meyerinck ........ B64F 1/28 137/615
4,844,133 A * 7/1989 von Meyerinck ........ B64F 1/28 137/615
4,898,211 A * 2/1990 Fournier ................. F16L 3/015 137/615
5,305,805 A * 4/1994 Watkins, Jr. .......... B60P 3/2265 137/615
5,803,779 A 9/1998 Horton
6,213,515 B1 * 4/2001 La Terra ................... B64F 1/28 137/351
6,701,980 B2 * 3/2004 Rothrock .................. B64F 1/28 137/615
7,415,990 B2 * 8/2008 von Meyerinck ........ B64F 1/28 137/615
7,438,617 B2 10/2008 Poldervaart et al.
7,543,613 B2 6/2009 Adkins et al.
8,100,076 B1 1/2012 Shivers et al.
8,286,678 B2 10/2012 Adkins et al.
2006/0231155 A1 10/2006 Harland et al.
2008/0048417 A1 * 2/2008 Schroeder ............. A01M 31/00 280/656

FOREIGN PATENT DOCUMENTS

WO 01/34460 5/2001
WO 2009/068768 6/2009

* cited by examiner

MULTI-FUNCTION UNIT FOR THE OFFSHORE TRANSFER OF HYDROCARBONS

This invention relates to a floating multi-function unit allowing for the transport of transfer hoses between a process vessel and an offshore unit (such as a buoy, a platform, a carrier).

The invention also relates to a hydrocarbon transfer arrangement for transfer of fluids such as liquefied gas (such as LNG, LPG or liquefied $CO_2$ . . . ) between a process vessel and an comprising unit which are placed in an offloading configuration, consisting of at least one transfer hose and a gas return hose, the end of the at least one transfer hose is connected to the floating multi-function unit allowing for the transport of the transfer hose between a process vessel and an offshore unit.

The present invention also refers to a method of establishing a transfer arrangement for fluids (such as liquefied gas) between two offshore units using a floating multi-function unit.

BACKGROUND OF THE INVENTION

The production of liquefied gas offshore by production and liquefaction of natural gas requires the transfer of the liquefied gas between floating units or seabed based offshore units, between one seabed based offshore unit and one floating unit. Concepts for offshore transfer system between two units usually involve the use of heavy lifting cranes, and complex systems including hydraulics, position control, ship movement compensation, and a large number of parts. It is also important to avoid clashes between the different conduits spaced closely together. This is especially the case for current ship to ship transfer systems suitable for LNG, which must be maintained at a temperature of −163° C. Therefore, current concepts are very heavy and expensive, operator unfriendly, difficult to maintain, and prone to failure. All existing transfer concepts are not ideal to be used in harsh environment and harsh sea state.

In this patent application, a preferred offshore transfer system configuration would be a tandem offloading configuration between two vessels. In a tandem offloading configuration the carrier will position itself in line behind the process vessel or FPSO (Floating Production Storage and Offloading unit). The position will be in-line with the current since the FPSO will weathervane. In between the FPSO and carrier, a hawser line will be holding the carrier at a certain distance from the FPSO. To insure that the carrier will not clash with the FPSO, back trust should be provided by the carrier.

In a tandem offloading configuration, it is also required to have means that will allow one or more offloading hoses to be lowered into the sea and will provide buoyancy at the end fitting locations, but also means to transport offloading hose(s) in the vicinity of the carrier. Further, one or more hoses (floating or submerged) needs to be lifted up from water level to a certain height, for example the vessels deck, which could be 10-30 m above water level, to be connected to a fluid piping manifold. The use of local cranes and/or winches is not always possible as the overall weight of the hose(s) to be lifted up is too large, because the lifting capacity is limited, or they are not located at the required/needed place on the deck. Moreover, installing additional lifting equipment or modifications on existing lifting systems onboard carriers is not a preferred solution, as it needs to be done on each carrier that must be connected to the hoses.

A solution that avoids any additional modifications to be made on board the carriers is advantageous as it can be used for any standard carrier.

The proposed system, manufactured under the trademark CryoRide™ by the applicant, is a key system to enable an easiest, fastest and cheapest offloading connection between two offshore units.

In this patent application the term "transfer hose" is used to designate all types of transfer hoses which are suitable for the transfer of hydrocarbons, in particular cryogenic fluids (at −163° C.) but also for the transfer of liquefied gas such as LPG and liquefied CO2.

SUMMARY OF THE INVENTION

It is therefore an object of the present invention to provide a multi-function unit that will function:

- as a fixation point holding the end fittings of the transfer hoses and components needed for this offloading procedure, and eliminates relative motion between the manifold of the carrier and the end fittings,
- as a floating structure for the end fittings of the transfer hoses and components that are merged in water, and
- as a lifting device for the end fittings and components to be brought at the level of the midship manifold of the carrier.

The present invention is also providing a simplified, less time-consuming and less expensive midship offloading configuration hydrocarbons transfer method.

In a preferred solution the multi-function unit is capable to deal with the different envelopes that are needed to connect the multi-function unit to the different manifolds of the different carriers. The multi-function unit is also able to shut down and disconnect in case of any emergency as well as to allow itself to purge the remaining hydrocarbons in the lines into the storage tanks of the FPSO or offshore unit and carrier.

BRIEF DESCRIPTION OF THE DRAWINGS

Preferred embodiments of the invention will now be described with reference to the accompanying drawings, in which.

In the embodiments chosen, there is a LNG-FPSO in tandem configuration with a LNG carrier. The transfer hoses are cryogenic transfer hose suitable for the transfer of LNG. However, it must be noted that the invention is applicable to any type of offshore transfer system between any types of offshore units.

Figure 1A:
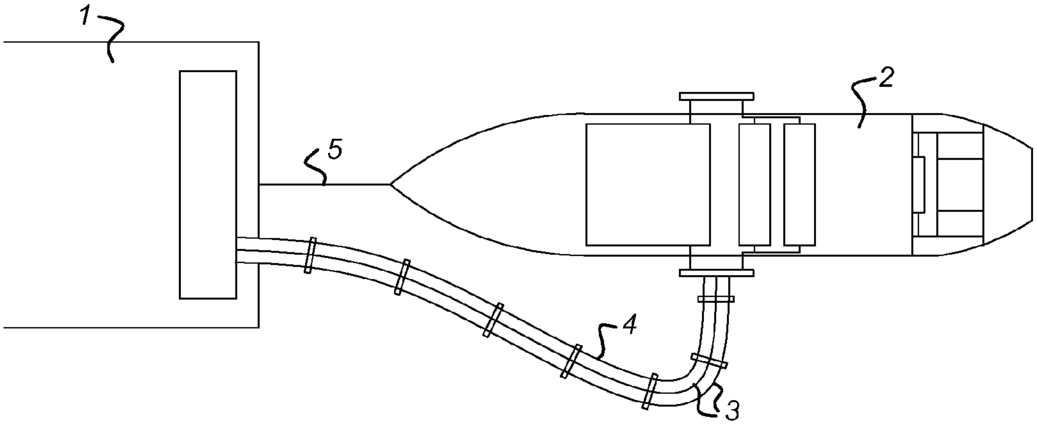
FIGS. 1*a*, 1*b* and 1*c* show different possible configurations of the transfer hoses between the two vessels.
Figure 1B:
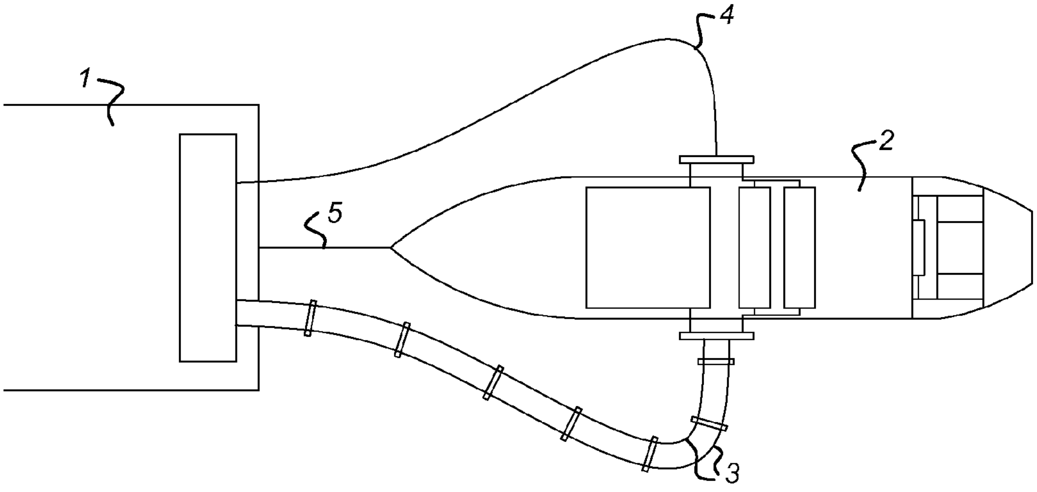
Figure 1C:
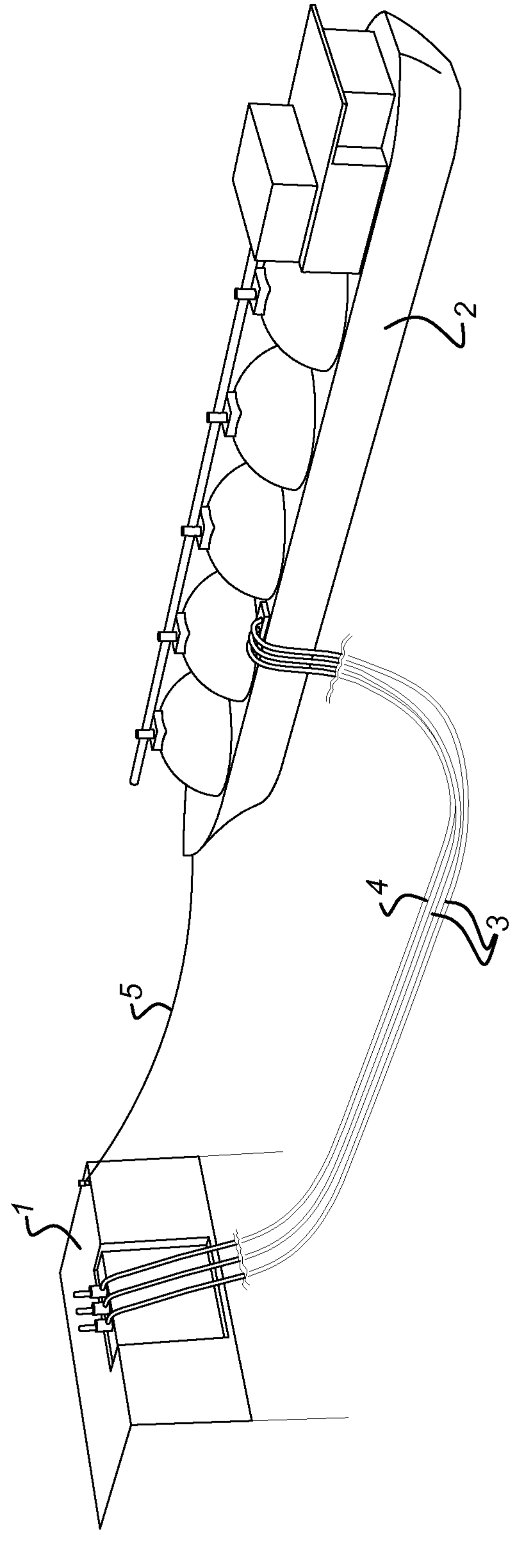

FIGS. 1*a*, 1*b* and 1*c* show different possible configurations of the hoses between the two vessels.

It is preferred in a LNG loading or offloading situation where the LNG FPSO or FSRU (Floating Storage and Regas Unit) or offshore unit 1 is spread or weathervaning moored, that the LNG carrier 2 is placed at a certain, safe distance during the transfer of LNG. In configurations where the offshore unit 1 is seabed based the LNG carrier 2 can be nearer to the unit 1.

The embodiment shown in FIGS. 1*a* and 1*b* show an overall offshore midship, tandem configuration, a cryogenic fluid transfer arrangement between a LNG process vessel 1 and a LNG carrier 2, with at least one cryogenic transfer hose 3 and one gas return line 4 which includes a traditional tandem offloading between a spread or turret moored vessel and a hydrocarbon transfer carrier, but which is optimized for an offshore LNG transfer situation. This offshore offloading configuration includes a spread or turret moored gas liquefaction barge or a spread or turret moored LNG FPSO 1 to which a standard LNG carrier 2 is connected via at least one special, extra long hawser(s) 5 and LNG is transferred between the two vessels via a relatively long floating, aerial or submerged cryogenic transfer system which could include one or more cryogenic hoses 3 or cryogenic hard pipes. For redundancy or stability reasons it could be necessary to have more than one of those special hawsers 5 between the two floating vessels 1, 2. The special hawser 5 according to the invention can be 50-300 m long and hence keeps the LNG carrier 2 at a safe distance of at least 90 m. At least one, more likely two or more tug boats will tow and keep the carrier 2 away from the spread moored LNG FPSO/FSRU 1 and ensure the correct heading during loading or unloading the LNG. In this way it is possible to load or offload LNG for situations where the carrier 2 can stay within the 90 degrees zone of the LNG FPSO or FSRU 1.

In FIG. 1*a*, it is clearly shown that three hoses 3, 4 are going onto the same side of the LNG-Carrier 2 midship manifold. Two cryogenic transfer hoses 3 and one gas return line 4.

In FIG. 1*b*, it is also clearly shown that two cryogenic transfer hoses 3 are going into the portside midship manifold of the carrier 2 and on starboard midship manifold one gas return line 4 is going back to the LNG-FPSO 1.

In FIG. 1*c*, the configuration is similar to the one shown in FIG. 1*a*, except that it is between a LNGC 2 and an offshore unit 1 which is non weathervaning.

The possible configurations according to the present invention should not be limited to those shown, and could include all types of possible configurations such as a configuration where:

two cryogenic transfer hoses are on one side, with one gas return line and one cryogenic transfer hose being on the other side of the LNGC.

three cryogenic transfer hoses are on one side, with one gas return line and one cryogenic transfer hose being on the other side of the LNGC.

three cryogenic transfer hoses and one gas return line on one side.

one cryogenic transfer hose with a divider piece at the end to connect the manifold and make a fluid connection with two inlets of the manifold.

FIGS. 2*a* to 2*d* show the multi-function unit 6 or CryoRide™ according to the present invention. The CryoRide™ design uses a modular and easy adaptable concept. Based on the needs of operators, location and projects, different line configurations can be chosen. The main functions of the CryoRide™ is to function as a fixation point holding the end fittings 7 of the cryogenic hoses 3 and required cryogenic component needed for this offloading procedure. It also needs to function as a floating structure when the end fittings 7 and the components are merged in water. Third main function of the CryoRide™ is to lift the end fittings 7 and cryogenic components to the level of the midship manifold 8 of the LNG-Carrier 2.

An other main function is that the system should be able to shut down and disconnect in case of any emergency and a last main function is that the system allows itself to purge the remaining LNG in the transfer hoses 3 into the storage tanks of the offshore unit 1 and LNG-Carrier 2.

The preferred base structure of the CryoRide™ is a tubular structure 9 providing buoyancy and known assembly technologies for cryogenic service. Low pressurized wheels 10 are fitted to the CryoRide™ structure to provide additional buoyancy to the system. The wheels 10 also act as fenders in case of a collision with the LNG carrier hull or the offshore unit hull and they are used to reduce the friction coefficient during the lifting against the carrier's hull by means of rotation provided by a composite bearing arrangement in the axis of the wheels 10.

Figure 2A:
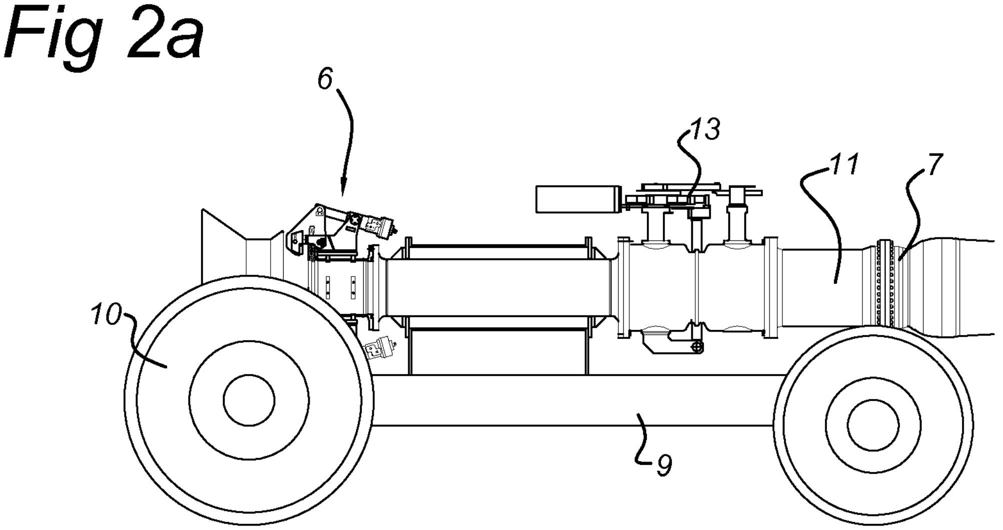
FIGS. 2*a* and 2*b* show the multi-function unit or CryoRide™ according to two embodiments of the present invention.
Figure 2B:
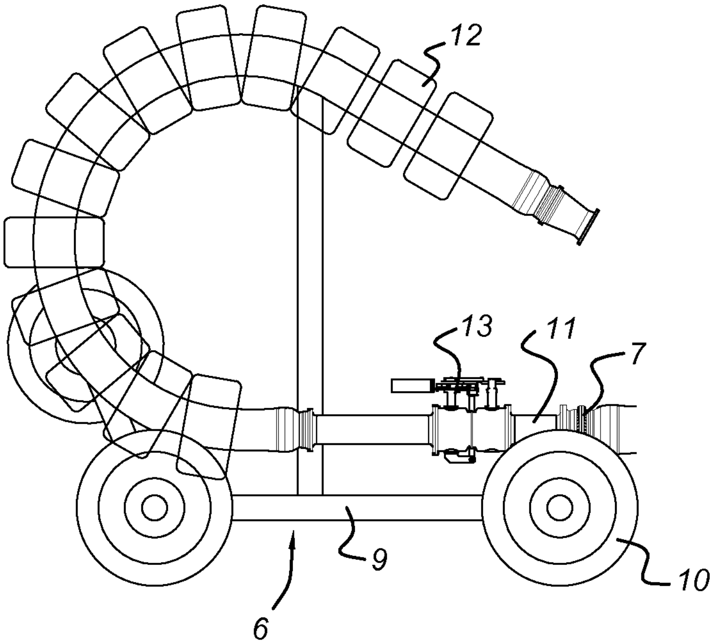
Figure 2C:
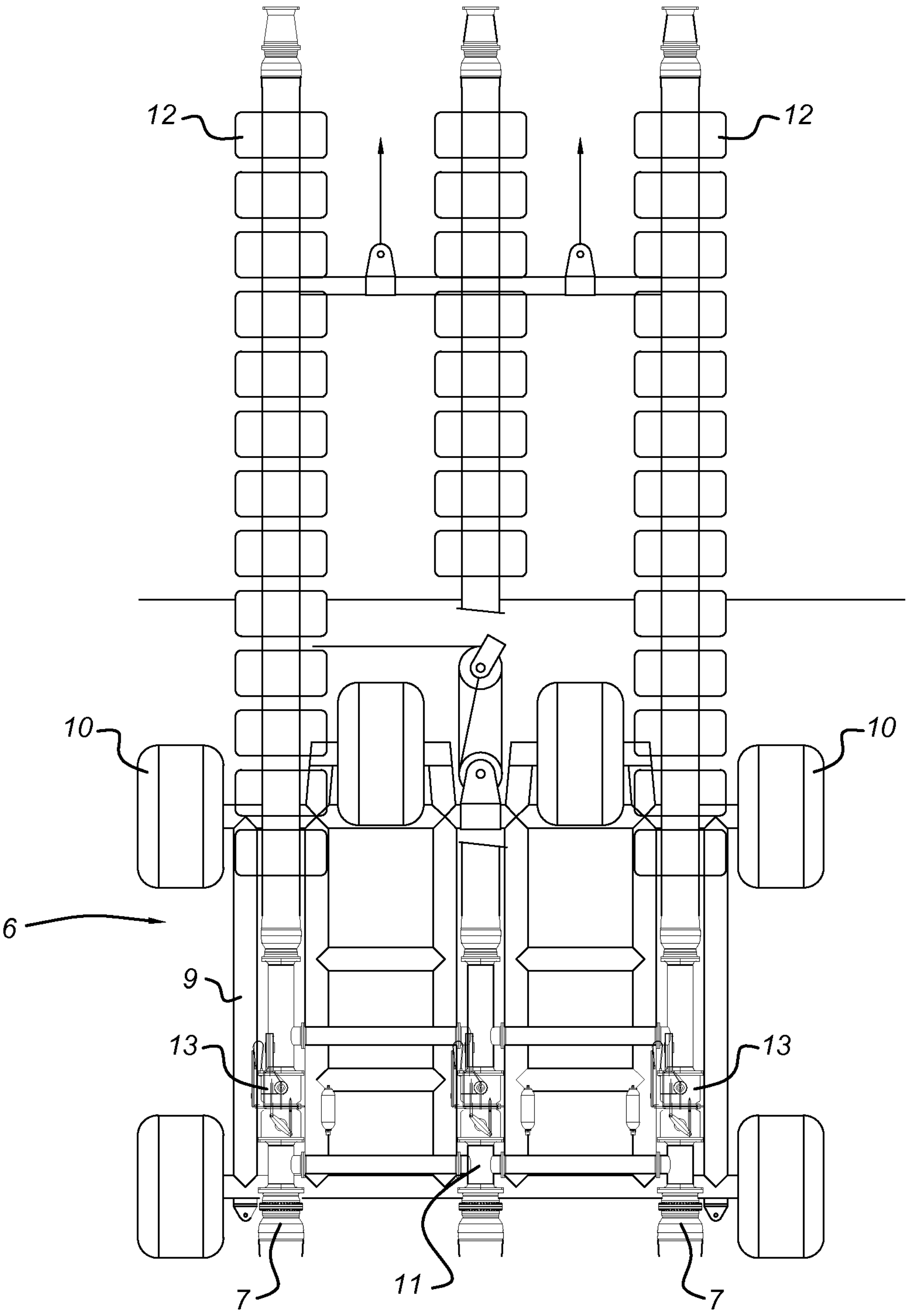
FIG. 2*c* shows a top view of the embodiment shown in FIG. 2*b*, FIGS. 3*a* to 3*k* show the sequential steps of pull-out, transport, lift and connect multiple floating hoses between a LNG process vessel and an LNGC.
Figure 4:
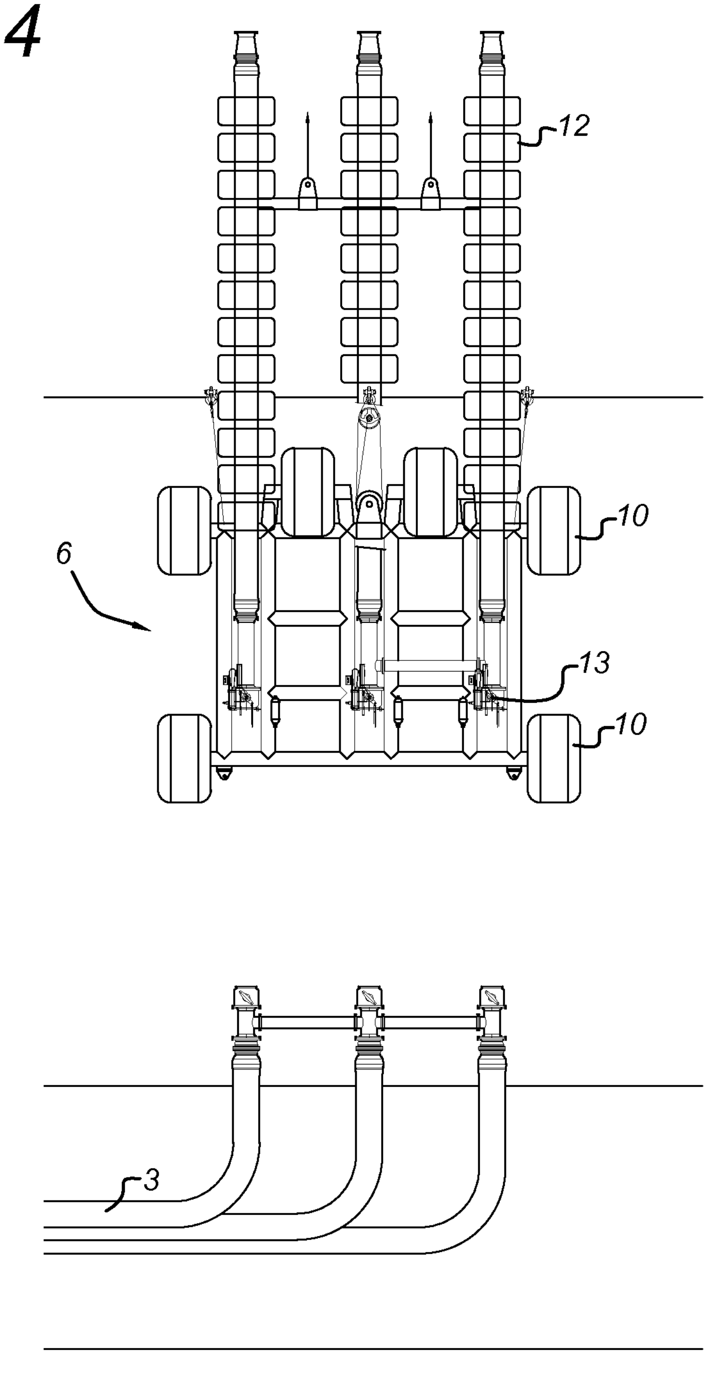
FIG. 4 shows how the hoses are interconnected in order to form a closed loop according to the present invention.

In FIG. 2*c* it is clearly shown that three rigid spool pieces 11 are fixed to the structure of the CryoRide™. In this embodiment 3 rigid spool pieces are shown and at least 2 spool pieces are needed to create a loop between two transfer lines or hoses. The main function of the spool pieces is to transfer the dynamic loads onto the pipe structure induced by the offloading hoses. The spool pieces 11 also function as an interface for the aerial jumper hoses 12. The spool pieces 11 are structurally inter-connected but only the two cryogenic transfer hoses or export lines 3 are cross-flow connected as shown in FIG. 4. It should also be mentioned that in some cases, when the gas return line has an equivalent design as the cryogenic transfer hoses and hence is able to withstand cryogenic fluids, it can be in fluid connection with one cryogenic transfer hose for the precooling of the hoses 3, before starting the offloading.

An insulation layer prevents thermal conduction from the spool pieces 11 to the rest of the CryoRide™ structure. One end of the spool pieces 11 is connected to an Emergency Response System (ERS) 13 and to the cryogenic offloading hose 3 while the other end is connected to a jumper hose 12. The jumper hose is a light, flexible, non insulated cryogenic hose with basic outer protection. A lifting frame 14 is connecting the three jumper hoses 12 together for handling procedures and also to lock the hoses during storage. The length and flexibility of the jumper hoses 12 is determined to provide the CryoRide™ with the widest operating envelope possible to connect the cryogenic transfer hoses 3, 4 on different non-dedicated LNG carriers' manifold arrangement.

The ERS 13 will be hydraulically actuated by hydraulic accumulators located onboard the structure which accumulators will be reloaded between each offloading at the offshore unit.

FIG. 2 *d* shows another embodiment, where the CryoRide™ is provided with three cryogenic spool pieces 11 are mounted on the tubular structure 9 to fixate three transfer hoses 3,4. In between the hoses and the spool pieces an Emergency Release System (ERS) 13 provides the required decoupling of the hoses during an emergency disconnection.

Between the ERS and the transfer hose flanges/end fittings, three more spool pieces interlink the transfer export lines. This will enable to purge the transfer hoses after disconnection with the carrier.

Three aerial jumper hoses 12 are mounted on the other side of the cryogenic spool pieces. They are supported by a hydraulic system HS guiding the aerial jumper hoses towards the carrier's manifold flanges, it is then possible to accommodate the manifold envelope height with respect to the type of carrier and/or manifold. This system is designed to make the final connection without obstructing any equipment or structures on the carrier's deck. The support system of the aerial jumper hoses 12 is driven by two hydraulic cylinders 20.

The aerial jumper hoses 12 are equipped with bend restrictors in order not to exceed the minimum bending radius. On the end fittings of the aerial jumper hoses 12, three manual QC/DCs are fitted to make the final connection with the carrier. The QC/DCs are blind flanged during transportation to avoid sea water and moisture ingress.

FIGS. 3*a* to 3*j* show the sequential steps of pull-out, transport, lift and connect of multiple floating hoses between a LNG process vessel and an LNGC. The CryoRide™ will be transported to the FPSO on a supply vessel or installation vessel. The floating hoses stored on the hose reels at the stern of the FPSO will be lowered to sea level and lifted on the lay down area of the installation/supply vessel. The hoses and the CryoRide™ will be connected together on the vessel and then dropped back in the water. The CryoRide™ can then be towed back to its storage position on the FPSO.

The CryoRide™ is stored on the deck attached to a hydraulic A-frame system 14. This has the advantage to provide a good access to the CryoRide™ for maintenance and re-pressurizing of the hydraulic accumulators. The A-frame 14 will be located behind the three hose reels 15 at the stern of the LNG-FPSO 1 where the cryogenic hoses 3 are stored. The hose end fittings 7 will be permanently bolted to the CryoRide™ hose interface. The two hose reels on the outside will be angled to accommodate the spacing constraint on the CryoRide™. The spacing constraint is according to international standards (SIGTTO/OCIMF recommendations for manifolds for refrigerated liquefied natural gas carriers).

Figure 3B:
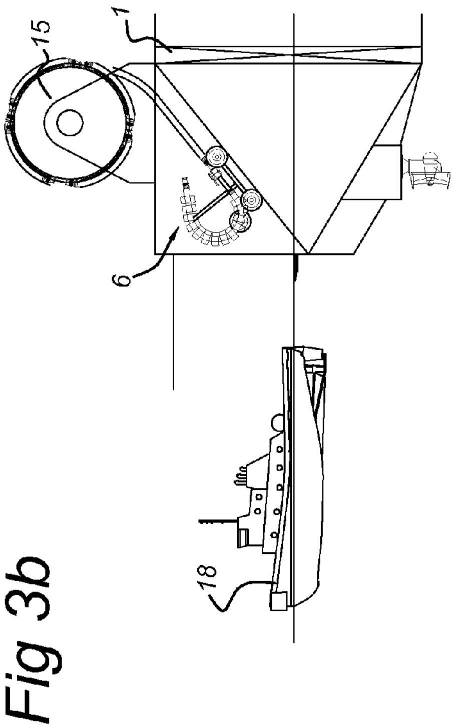
Figure 3D:
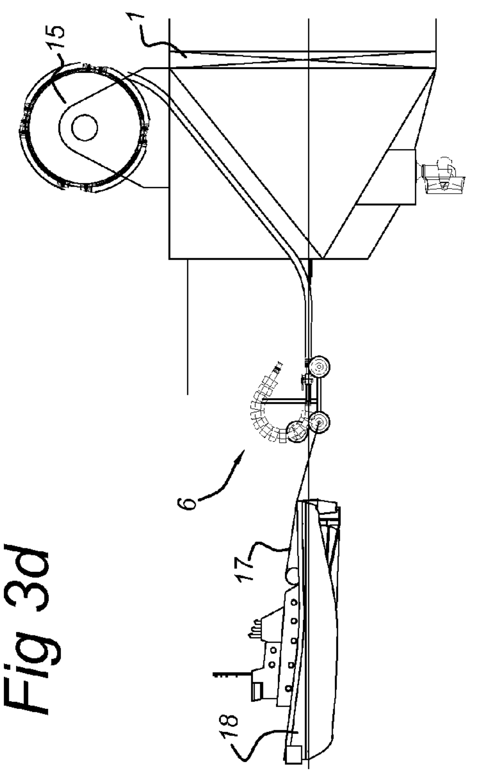
Figure 3A:
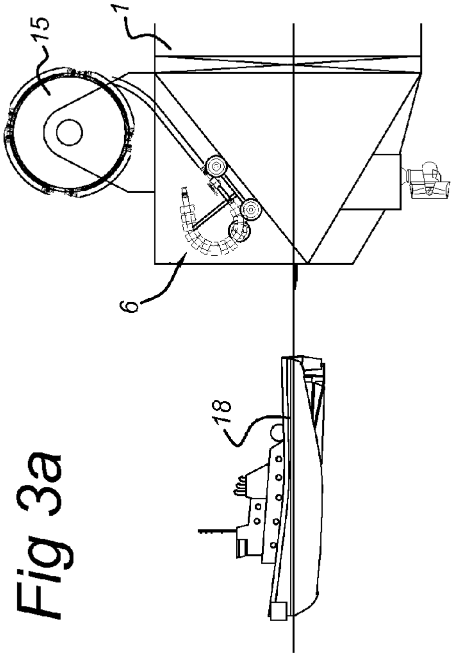
Figure 3C:
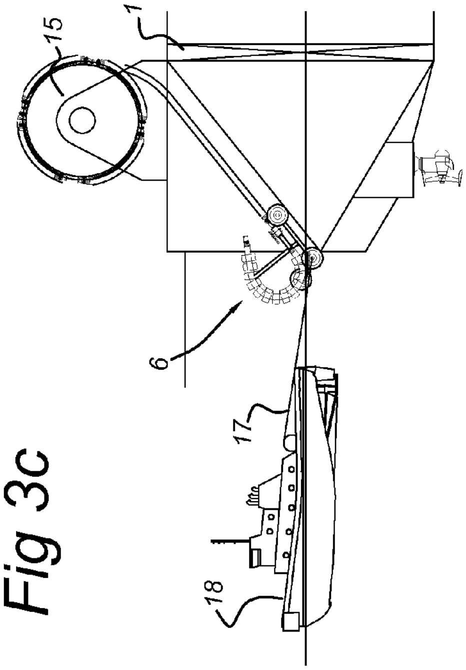

FIG. 3*a* shows the lowering or launching the CryoRide™. The CryoRide™ will be flipped overboard by means of the A-frame 14. After the CryoRide™ is decoupled from the A-frame 14, winches 16 are attached to it, lowering the CryoRide™ into the sea, as shown in FIGS. 3*b* and 3*c*. Parallel to this operation the hose reels 15 will be unwind by electromotor and pinions driving a turntable attached to the reels.

In another embodiment (not shown), there would be ramps integrated in the hull of the FPSO that will function as launching platform. The hose reels are located above the launch platform and the hoses are pre-connected with the CryoRide™. On the motor of the hose reels the CryoRide™ will be launched into the water or reeled back in onto the launching platform. It is also a location for the re-pressurizing of the accumulators and for maintenance of the system. In this embodiment, the hose reels will operate the launching and pulling in of the CryoRide™.

Figure 3E:
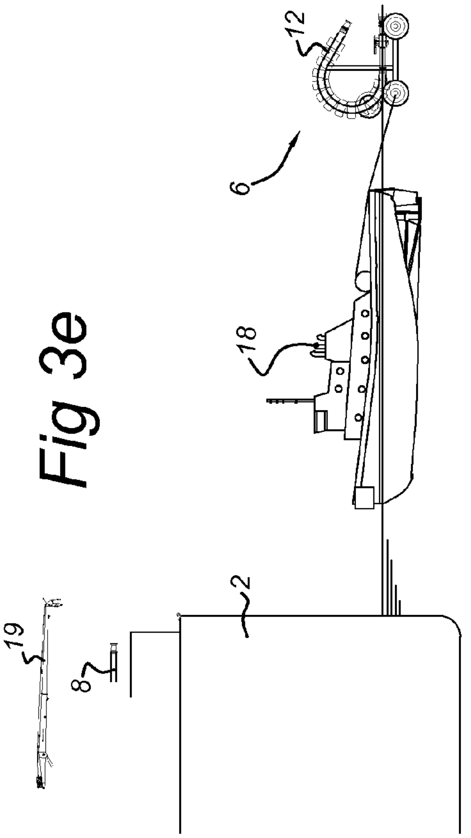

In FIGS. 3*d* and 3*e*, it is clearly shown that a support vessel 18 will connect a pulling rope 17 with a hook onto the pulling bar or lugs of the CryoRide™ and tow it along with the cryogenic floating hoses 3 to the LNGC 2. The hose reels 15 will need to release the hoses 3, 4 at different velocities (faster for the foremost hose in the tandem configuration).

The next step is the lifting preparation of the CryoRide™. The CryoRide™ unit has a central sheave block stored with a length of 85 m synthetic or steel wire rope wired through a pivoting sheave constructed on the CryoRide™ frame. On the sheave block a shackle will make the connection with the strong point on the vessel located also central regarding the midship manifold.

Figure 3F:
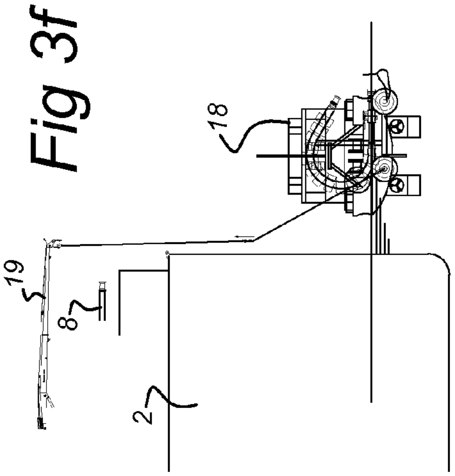

FIG. 3*f* shows clearly the shackle on the sheave side being picked up with the manifold crane 19 and connected to a strong point on the LNG carrier's deck central regarding the manifold deck. Then the sheave block is lifted to deck level with the manifold crane 19 and connected to the lug. The pulling load line of the sheave block rigging will be routed towards the most convenient mooring winch 20 located at stern or bow. The wire rope should be routed where there are the fewer obstacles on the deck.

Figure 3G:
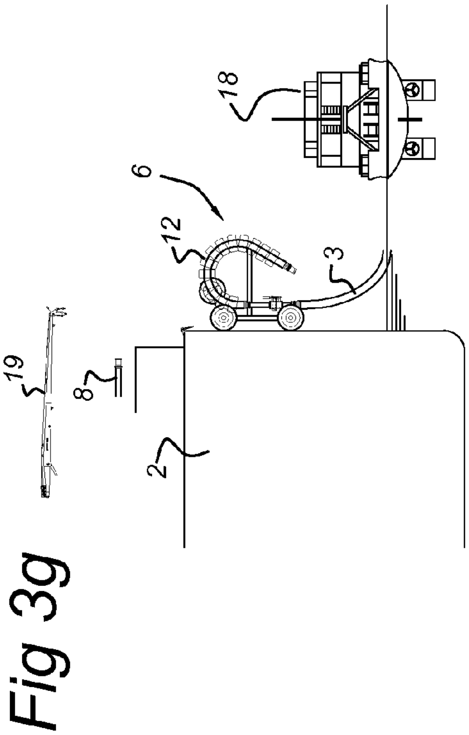

The lifting is then possible, and as shown in FIG. 3*g*, the mooring winch 20 which is placed near the bow or the stern area of the LNG carrier, can be connected to the CryoRide™ and lift it up the hull up to about 1 m below deck level. During this lifting process, the manifold crane can be used to guide and/or displace the multi function unit in a horizontal direction along the length of the vessel so that in the end the multi function unit is placed within the connection envelop near the manifold.

Another lifting embodiment is to use the two mooring winches on the stern and bow of the LNG-Carrier 2. This will be a "two point lifting" solution.

Length of synthetic ropes and adequate lifting equipment with messenger lines are also fitted onboard the CryoRide™ making the lifting procedure easier.

The snubbing chains will be connected to the available lugs on the deck of the LNG carrier in order to secure the CryoRide™.

Figure 3H:
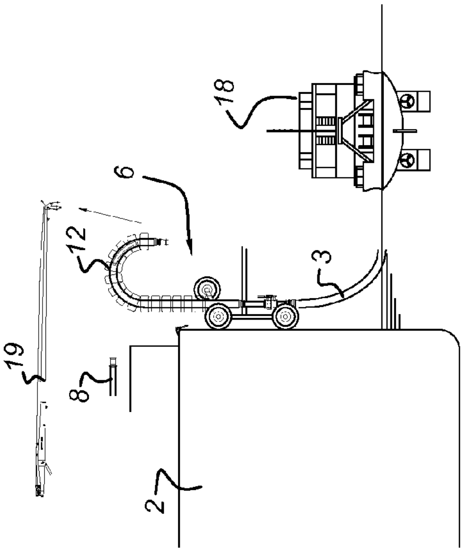
Figure 3I:
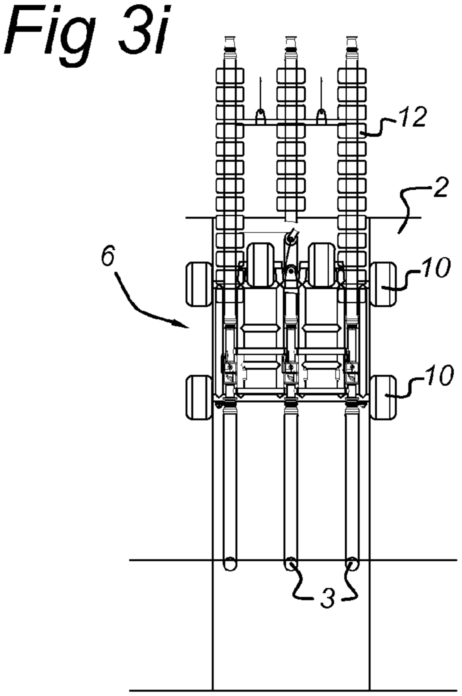

FIGS. 3*h* and 3*i* show how the jumper hoses are flipped over during lifting and positioned at the manifold location. The manifold crane 19 will be connected to the flexible jumper hose 12 lifting frame on its rotating lifting point. The blind flanges can be removed and a manual or hydraulic QCDC (already connected to the jumper hoses 12) will be connected to the manifold flange.

Figure 3J:
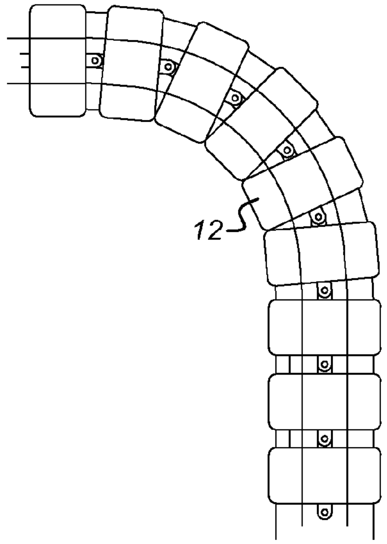

Another embodiment is to have cables placed within the jumper hoses 12 to control the bending of the jumper hose 12. This way the bending in one plane is allowed and limited thanks to stoppers, as shown in FIG. 3*j*. A small winch installed on the CryoRide™ could make the jumper hoses 12 bend in the desired direction at the desired moment without requiring the use of the manifold crane 19.

Figure 3K:
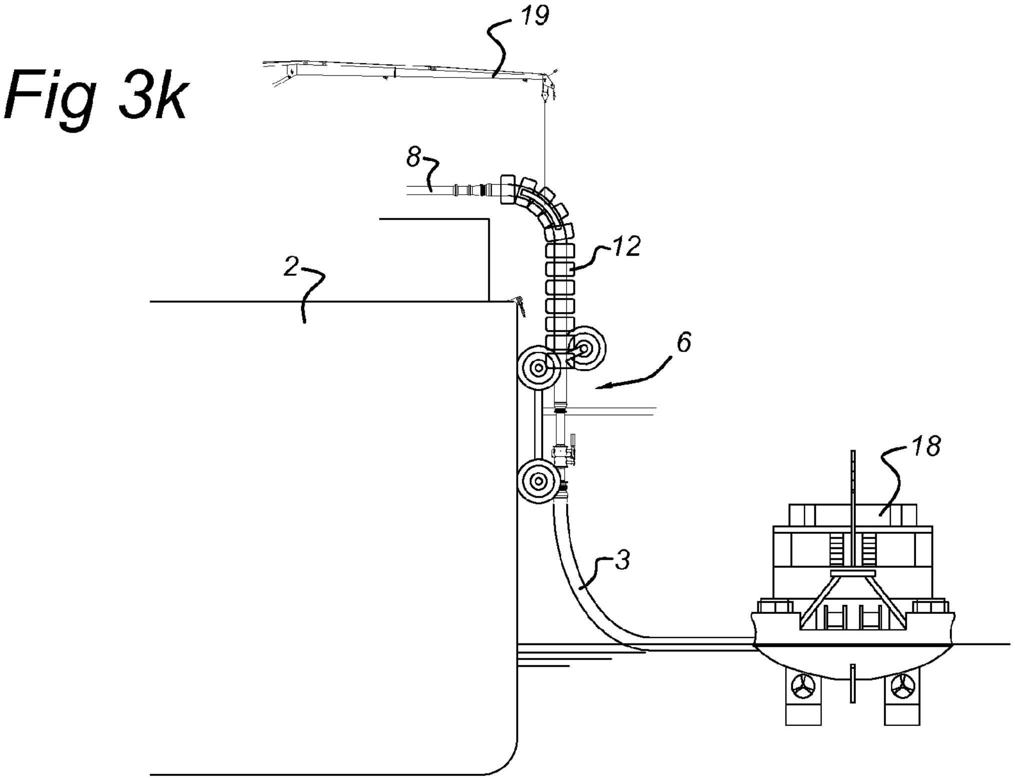

As shown in FIG. 3*k*, the cryogenic transfer hose is now connected and secured, conventional export of LNG can start with cool down as discussed and shown on FIG. 4, and transfer.

When the offloading is over, the disconnection of jumper hoses is held as follow: after cool down, jumper hoses 12 are disconnected and stored back on the CryoRide™ using the manifold area crane 19 on the LNG carrier 2. The CryoRide™ will be lowered back into the sea and the support vessel 18 will store the rigging equipment back onto the CryoRide™. Then the support vessel 18 will tow the CryoRide™ back and disconnect the towing cable 17. The hose reel 15 will then reel the CryoRide™ back into the LNG-FPSO 1 or will be lifted up back onto the A-Frame support structure 14.

As mentioned above, FIG. 4 shows how the hoses are interconnected in order to form a closed loop according to the present invention. It is clearly shown that the cryogenic hoses 3 are flow connected, hence forming a closed loop. This is enabling the cryogenic transfer hoses to be cooled down before the transfer starts. In fact, a cold fluid within the interconnected hoses is pumped in order to precool the hoses before offloading.

Another key point of having such a closed loop is that in case of an emergency, the lower and upper parts of the ERS 13 are decoupled by the mean of a PERC.

The two cryogenic transfer hoses 3 with trapped LNG are inter-connected by the spool piece 11 and can be purged using nitrogen form the LNGC. A similar spool piece 11 inter-connects the cryogenic transfer hoses 3 ends and creates a loop in order to purge out the remaining LNG to the FPSO storage tanks.

Figure 5C:
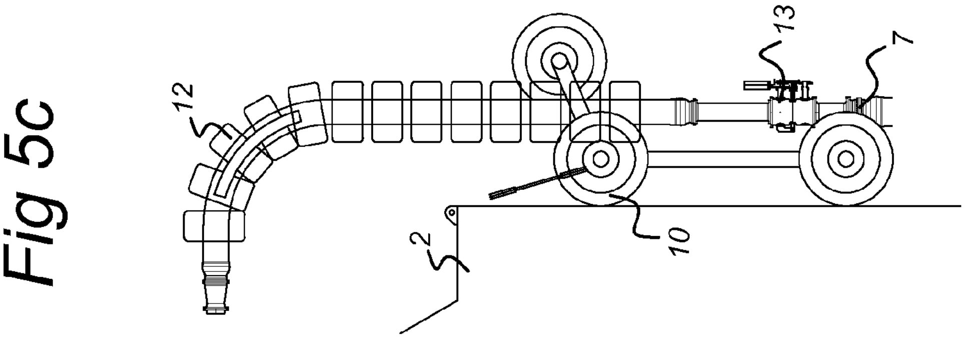
FIGS. 5*a* to 5*c* show how the flexible jumper hose with bend restrictor elements is positioned towards the manifold with cables connected to small auxiliary winches on the multi function unit.
Figure 5B:
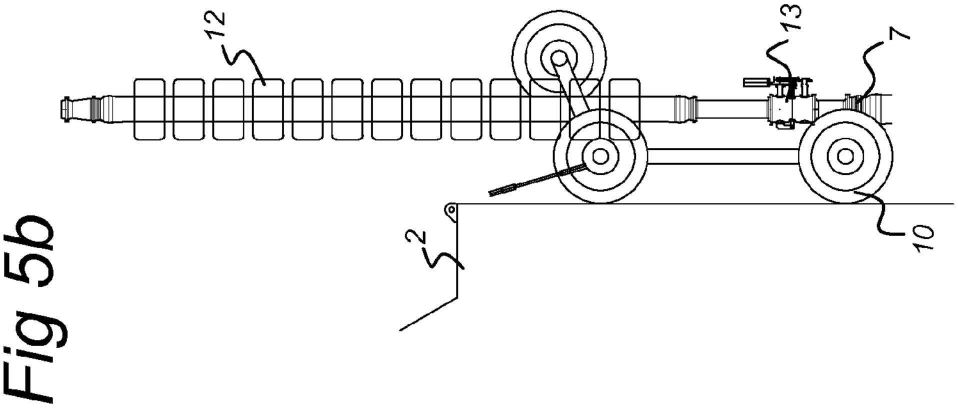
Figure 5A:
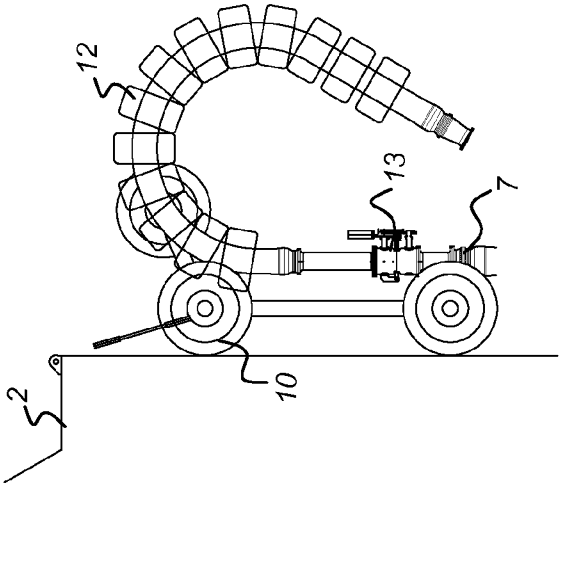
Figures 6A, 6B, 6C, 6D, 6E:
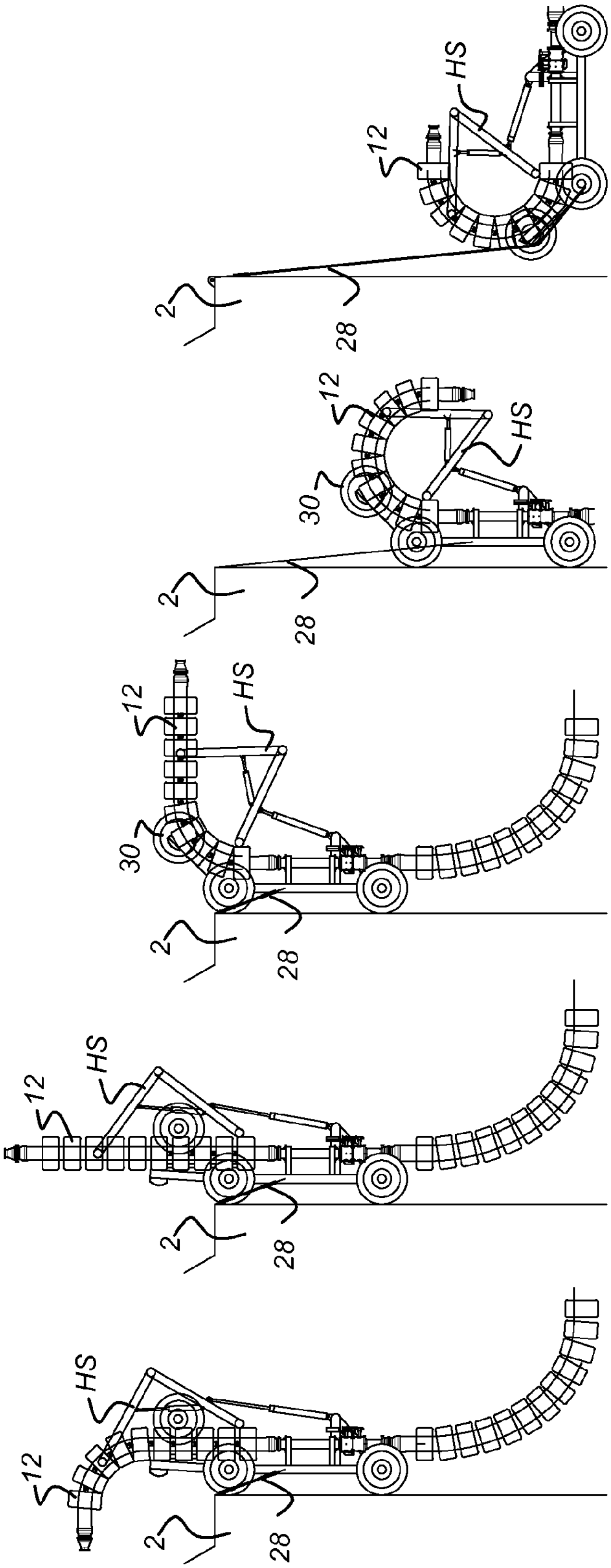
FIGS. 6*a* to 6*e* show the embodiment of FIG. 2*c* in a sequence when the CryoRide™ is disconnected from the manifold of the carrier.

FIG. 5 shows how the flexible jumper hose with inter-connected pivoting bend restrictor elements can be brought towards the manifold with cables that are guided within the bend restrictor elements and which are connected to one or more small auxiliary winches on the multi function unit. If one cable is drawn-in and the other is paid-out the jumper hose end flips over and is moved towards the manifold end (over bending is restricted). In a reverse action the jumper hose is forced again in a storage position on the multi function unit.

FIGS. 6*a* to 6*d* show the embodiment of FIG. 2*d* in a sequence when the CryoRide™ is disconnected from the manifold of the carrier 2. In these figures it clearly appears that the hydraulic system is used to bend the aerial jumper hoses 12. In this embodiment it is also important to note that the CryoRide™ is provided with lifting equipment that enables it to lift itself autonomously out of the water against the hull of the carrier. Hence, as shown in the particular embodiment of FIGS. 1*d* and 6*a* to 6*d*, two hydraulic winches are mounted on the CryoRide™, the winch cables 28 are connected to two strong points at the carrier deck level at midship manifold location. This connection will be achieved via messenger lines pick up from a supporting tug boat.

Hydraulic power will be supplied also from the support tug boat. An umbilical on a hose reel is connected to the CryoRide™ to power the hydraulic systems on the CryoRide™. After the lifting operation the CryoRide™ will be secured with snubbing chains in order to relief the hydraulic power from the winches.

Hydraulic umbilical will be disconnected either manual or remotely and reeled back to the support tub boat. Several options to power the hydraulic systems are as follow:

HPU and diesel engine on CryoRide.

Umbilical from support vessel.

Umbilical direct from LNGC midship manifold location.

Umbilical from FLNG via hawser to midship to CryoRide.

Umbilical from FLNG routed via the COOL hose

Further, guiding means are provided for the lifting of the multi function unit.

It should also be noted that the transfer hose as well as the CryoRide™ can be stored on the FPSO.

Further it appears clearly that a third wheel is provided in this embodiment. This third wheel has two main functions: it enables to protect the equipment located on top of the CryoRide™ (such as the hydraulic system and the jumper aerial hoses 12) when it approaches the hull of the carrier. Further, it enables a smoother transition from the horizontal position to the vertical position.

Figure 7B:
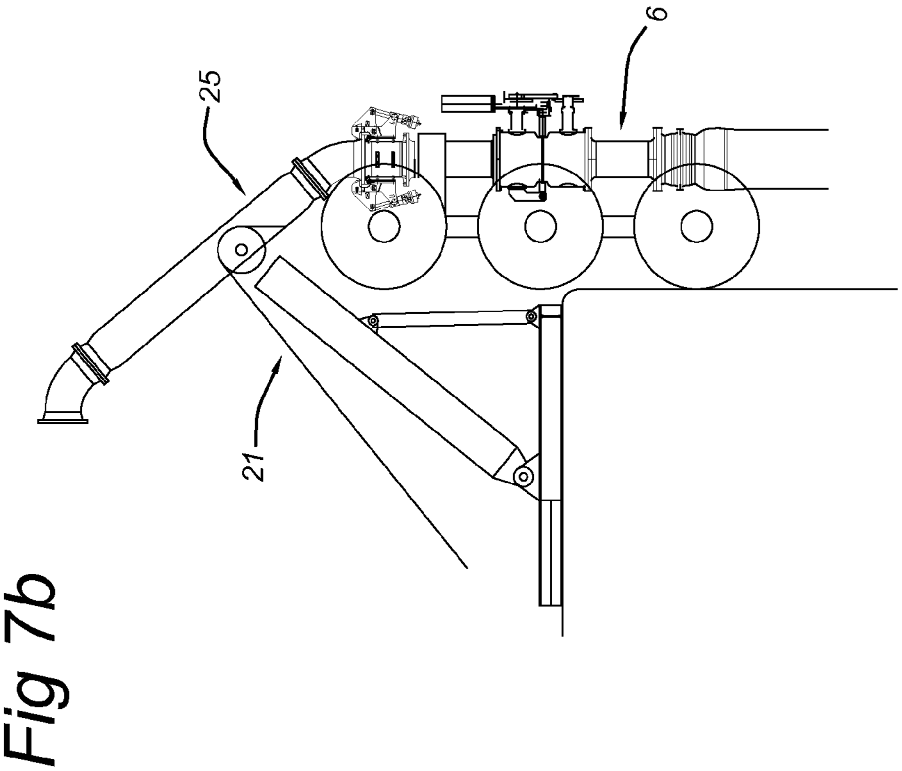
FIG. 7*b* shows the connection of a transfer hose between a LNG process vessel and an LNG carrier via a multi function unit and using a mobile lifting means to be pre-installed on the non-dedicated LNG carrier.
Figure 7A:
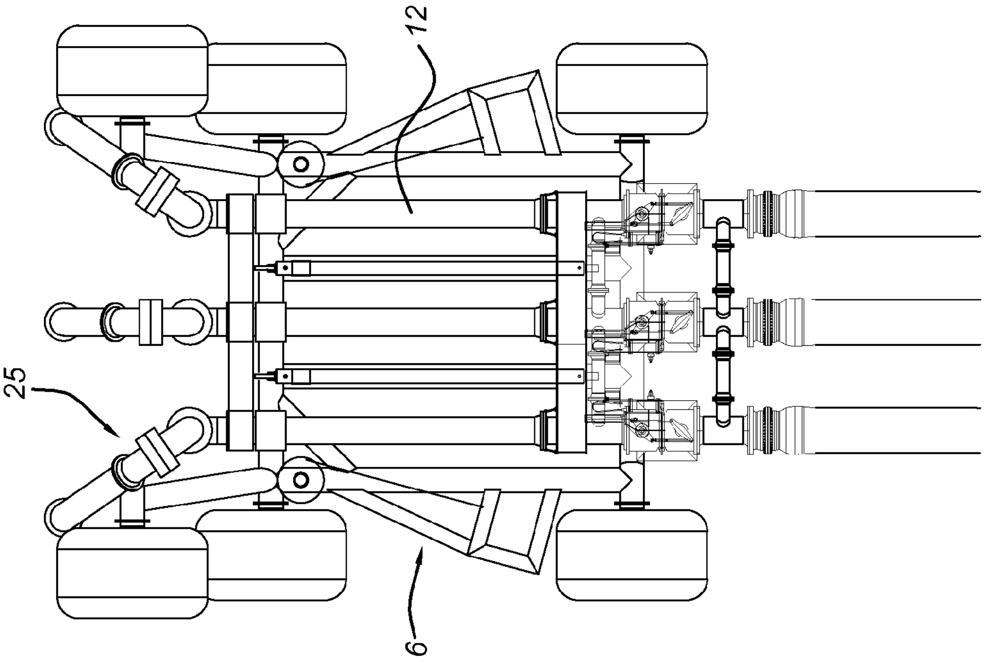
FIG. 7*a* shows a top view of another embodiment according to the present invention.

Another alternative design according to the present invention is as shown in FIG. 7*a*. First to get a much more compact design, especially a much more flat design of the multi-function unit, the jumper hose 12 is shorted and the flip-over movement is not required anymore. An arrangement comprising several swivels 25 (such as motorized swivels) enables the connection of the jumper hose end and the manifold 8 of the carrier. The jumper hose 12 can be already installed on the multi-function unit 6 or can be connected to the unit 6 just before connection with the manifold 8, when the multi-function unit 6 is at the right height and the access to it is easier.

In FIG. 7*b*, there is shown a mobile lifting means 21 to be pre-installed on the non-dedicated LNG carrier 2 before offloading. In the embodiment shown in FIG. 7 the lifting means 21 comprises a frame with winches and a hydraulic piston for the overboard distance to be varied depending on the manifold's height. The support vessel will deliver the lifting means 21 to the LNG-carrier 2 where it will be lifted onto the deck of the carrier with the manifold crane (not shown).

This mobile lifting means 21 allows lifting the CryoRide™ 6 out of the sea onto the hull and lifts the CryoRide™ 6 to the required height in order to connect the flexible jumper hoses 12 to the manifold.

The lifting mean is bolted to the deck using the dedicated sea fastening means in order to make the connection with the mobile lifting means.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

The following clauses describe embodiments in accordance with the invention.

A fluid transfer arrangement may comprise a multi-function unit wherein the number of hoses that are fixed to the multi-functional floating unit can be variable, depending on the fluid transfer arrangement desired in specific situations and environments.

A fluid transfer arrangement may provide a temporary fluid transfer loop that is created between a transfer hose and the gas return hose.

The gas return hose of the fluid transfer arrangement may be capable of transferring liquefied gas in case of an emergency disconnection of the multi-function unit at the carrier.

A fluid transfer arrangement may comprise a gas return hose that is an LPG hose capable of transferring fluids at −70 degrees C.

A fluid transfer arrangement wherein two adjacent hoses are kept at a distance from each other by multiple separation members.

A fluid transfer arrangement wherein the hoses are surface floating hoses.

A fluid transfer arrangement wherein in case of emergency, all the hoses that are connected to a multi-function unit, are disconnected at their emergency disconnection means.

A fluid transfer arrangement wherein in case of emergency disconnection, a closed loop is formed at the disconnected multi-function unit part between at least two hoses to purge out trapped liquefied gas in the interconnected hoses towards the process vessel.

A fluid transfer arrangement wherein in case of emergency disconnection, a closed loop is formed via the spool piece part of the multi-function unit that stays connected to the midship manifold of the carrier, after the rest of the multi-function unit is disconnected from the carrier.

A multi-function unit as may be provided with a remote controlled thruster.

A multi-function unit may be provided with autonomous lifting means.

A multi-function unit may be provided with mobile lifting means to be pre-installed on the non-dedicated carrier.

A floating multi-function unit for an offloading configuration between an offshore unit and a carrier, to which at least one hose is connected and the unit being connectable to the midship manifold of a carrier, wherein the multi-function unit functions a) as a floating support and fixation point for the end of a transfer hose and particular components that are needed for a fluid transfer connection and b) as a lifting device for the end of a transfer hose and particular components to be brought up near or at the level of the midship manifold of a carrier.

A Method of establishing a transfer arrangement for cryogenic fluids between a LNG process vessel and a LNG carrier which are placed in a tandem configuration, consisting of at least one cryogenic transfer hose and a gas return hose, the end of the at least one transfer hose is connected to a floating multi-function unit allowing for the transport of the transfer hose between the process vessel and the LNG carrier, comprising the steps of a) moving the floating multi-function unit near the midship manifold of the LNG carrier, b) connecting the unit to at least one cable that is connected to a bow and/or stern mooring line winches of the LNG carrier and lifting the unit up to a predetermined height above water level, c) securing the lifted unit by hanging it on snubbing chains that are connected to fixed points on the LNG carrier and d) making the fluid connection between the hose end on the unit and the manifold via a flexible jumper hose.

In the above method, the vertical positioning of the unit may be carried out by the manifold crane.

The vertical positioning of the unit may be effected by autonomous lifting means.

Guiding means may be provided for the lifting of the multi function unit.

In a method according to the invention for cooling down a hydrocarbon transfer arrangement for transfer of cryogenic fluids between a LNG process vessel and a LNG carrier which are placed in an offloading configuration, comprising at least one cryogenic transfer hose and a gas return hose, the ends of both hoses being connected to a floating multi-function unit allowing for the transport of the transfer hose between the process vessel and the LNG carrier, at the multi-function unit the ends of the two hoses are temporarily interconnected, forming a closed loop so that the transfer hose is cooled down by pumping a cold fluid within the interconnected hoses.

The method for cooling down a hydrocarbon transfer arrangement for transfer of cryogenic fluids may be used for fluid transfer between a LNG process vessel and a LNG carrier which are placed in a tandem configuration, consisting of at two cryogenic transfer hoses and a gas return hose, the ends of the cryogenic transfer hoses being connected to a floating multi-function unit allowing for the transport of the transfer hose between the process vessel and the LNG carrier, wherein at the multi-function unit the two cryogenic transfer hoses are temporary interconnected with each other to form a closed loop so that both hoses are cooled down simultaneously by pumping a cold fluid within the interconnected hoses.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

The invention claimed is:

1. A hydrocarbon transfer unit comprising:

a frame with at least one hydrocarbon transfer hose attached to the frame via a releasable coupling (13), the frame comprising at least two spaced-apart transport members (10) for transporting the unit transversely across a deck of an offshore unit to which the transfer hose is attached and vertically upward from water level against a hull of a carrier that is in a transfer position relative to the offshore unit, configured for establishing a transfer arrangement for cryogenic fluids between a cryogenic process vessel and a carrier vessel, by:

a. providing the hydrocarbon transfer unit at the end of the transfer hose on the process vessel (1), b. lowering the transfer unit into the sea and paying out the transfer hose from the process vessel (1) while floating the transfer unit to the carrier vessel, c. connecting the transfer unit to a cable on the carrier vessel and pulling the transfer unit vertically upward along the hull of the carrier vessel while the transport members (10) are supported against the hull, and d. making a fluid connection between the end of the transfer hose carried by the unit and a manifold on the carrier vessel.

2. The hydrocarbon transfer unit according to claim 1, wherein the frame comprises a front end, the transport members (10) having a first rotation axis connected to the frame, the frame carrying a front transport member rotatable around a second rotation axis substantially parallel to the first rotation axis.

3. The hydrocarbon transfer unit according to claim 1, wherein the transport members comprise two sets of wheels rotatable about respective spaced apart rotation axes.

4. The hydrocarbon transfer unit according to claim 2, wherein the transport members comprise two sets of wheels rotatable about respective spaced apart rotation axes.

5. The hydrocarbon transfer unit according to claim 3, wherein the front transport member comprises two spaced-apart wheels.

6. The hydrocarbon transfer unit according to claim 4, wherein the front transport member comprises two spaced-apart wheels.

7. The hydrocarbon transfer unit according to claim 1, wherein the frame is provided with lifting equipment for hauling in a cable attached to said lifting equipment.

8. The hydrocarbon transfer unit according to claim 1, wherein the frame carries a hose (12) and a motorized swivel (25) attached to the end part of the hose for connecting to a manifold on the carrier.

9. The hydrocarbon transfer unit according to claim 1, further comprising a front transport member, and wherein the frame comprises a front end, the transport members (10) have a first rotation axis connected to the frame, the frame carrying the front transport member rotatable around a second rotation axis substantially parallel to the first rotation axis.

* * * * *